(12) United States Patent
Sinha et al.

(10) Patent No.: US 12,112,060 B2
(45) Date of Patent: Oct. 8, 2024

(54) MULTI-HOST COMMUNICATIONS

(71) Applicant: Micron Technology, Inc., Boise, ID (US)

(72) Inventors: Gaurav Sinha, Bayern (DE); Marco Redaelli, Bayern (DE); Shivamurthy Shastri, Bayern (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/939,628

(22) Filed: Sep. 7, 2022

(65) Prior Publication Data
US 2024/0078037 A1    Mar. 7, 2024

(51) Int. Cl.
*G06F 3/06* (2006.01)

(52) U.S. Cl.
CPC .......... *G06F 3/0656* (2013.01); *G06F 3/0604* (2013.01); *G06F 3/0679* (2013.01)

(58) Field of Classification Search
CPC ..... G06F 3/0656; G06F 3/0604; G06F 3/0679
See application file for complete search history.

(56) References Cited

U.S. PATENT DOCUMENTS

| | | | | |
|---|---|---|---|---|
| 11,782,603 B2 * | 10/2023 | Shimada | ............... | G06F 3/0679 711/154 |
| 2017/0123721 A1 * | 5/2017 | Sela | ...................... | G06F 3/0611 |
| 2019/0079698 A1 * | 3/2019 | Lee | ........................ | G06F 3/0611 |
| 2022/0137874 A1 * | 5/2022 | Hsu | ........................ | G06F 3/061 711/154 |
| 2023/0161506 A1 * | 5/2023 | Thatcher | ............... | G06F 3/0656 711/154 |

* cited by examiner

*Primary Examiner* — Anh Nguyen
(74) *Attorney, Agent, or Firm* — Holland & Hart LLP

(57) ABSTRACT

Methods, systems, and devices for multi-host communications are described. In some examples, a memory system may be coupled with multiple host systems. The memory system may facilitate communications between the multiple host systems For example, a first host system may be coupled with a first buffer of the memory system and a second host system may be coupled with a second buffer of the memory system. The first host system may have read and write access to the first buffer and read access to the second buffer. In response to a write operation being initiated by the first host system, data may be written to the first buffer. The second host system may read the data written to the first buffer. The second host system may take an action or respond based on the data read from the first buffer.

25 Claims, 8 Drawing Sheets

MULTI-HOST COMMUNICATIONS

FIELD OF TECHNOLOGY

The following relates to one or more systems for memory, including multi-host communications.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Some memory systems may utilize shared storage between two or more host systems. For example, some automotive systems may utilize shared disk file systems (SDFS) where a memory device (e.g., a non-volatile memory device) is shared by multiple host systems. The memory device may include a namespace (e.g., an address space) that is shared between the host systems. In such cases, synchronization between the host systems may be used to avoid the host systems inadvertently writing data to a same address or overwriting data from other host systems.

In some cases, SDFS (or non-file systems supporting shared namespace access) rely on a communication channel (e.g., a TCP/IP connection) between the host systems for synchronization purposes or may use a reservation system to lock namespaces. However, using reservation systems some namespaces may be undesirably locked for a duration and sometimes host-to-host communication channels are not available. For example, a first host system may reserve access to a namespace for a duration, which may prevent a second host system (or any other host systems) from accessing the namespace. Accordingly, a system configured to synchronize host system accesses to a shared namespace, without locking the entire namespace, may be desirable.

A system configured to synchronize host system accesses to a shared namespace is described herein. In some examples, a system may include a memory device coupled with one or more host systems. The memory device may include a buffer (or multiple buffers) that are accessible by the host systems. For example, the memory device may include a first buffer (or a first partition of a buffer) coupled with a first host system, a second buffer (or a second partition of a buffer) coupled with a second host system and so on. A host system may have both read and write access to a buffer that is coupled with and may have read access to buffers coupled with other host systems. Accordingly, when a write operation is initiated by a first host system, data may be written to the first buffer and the second host system may be able to read the data written to the first buffer. By utilizing such an architecture, multiple host systems may access a memory device using a SDFS (or any file system or non-file based system) while communicating with each other without a host-to-host communication link (e.g., TCP/IP connection) and without locking an entire shared namespace.

Figure 1:
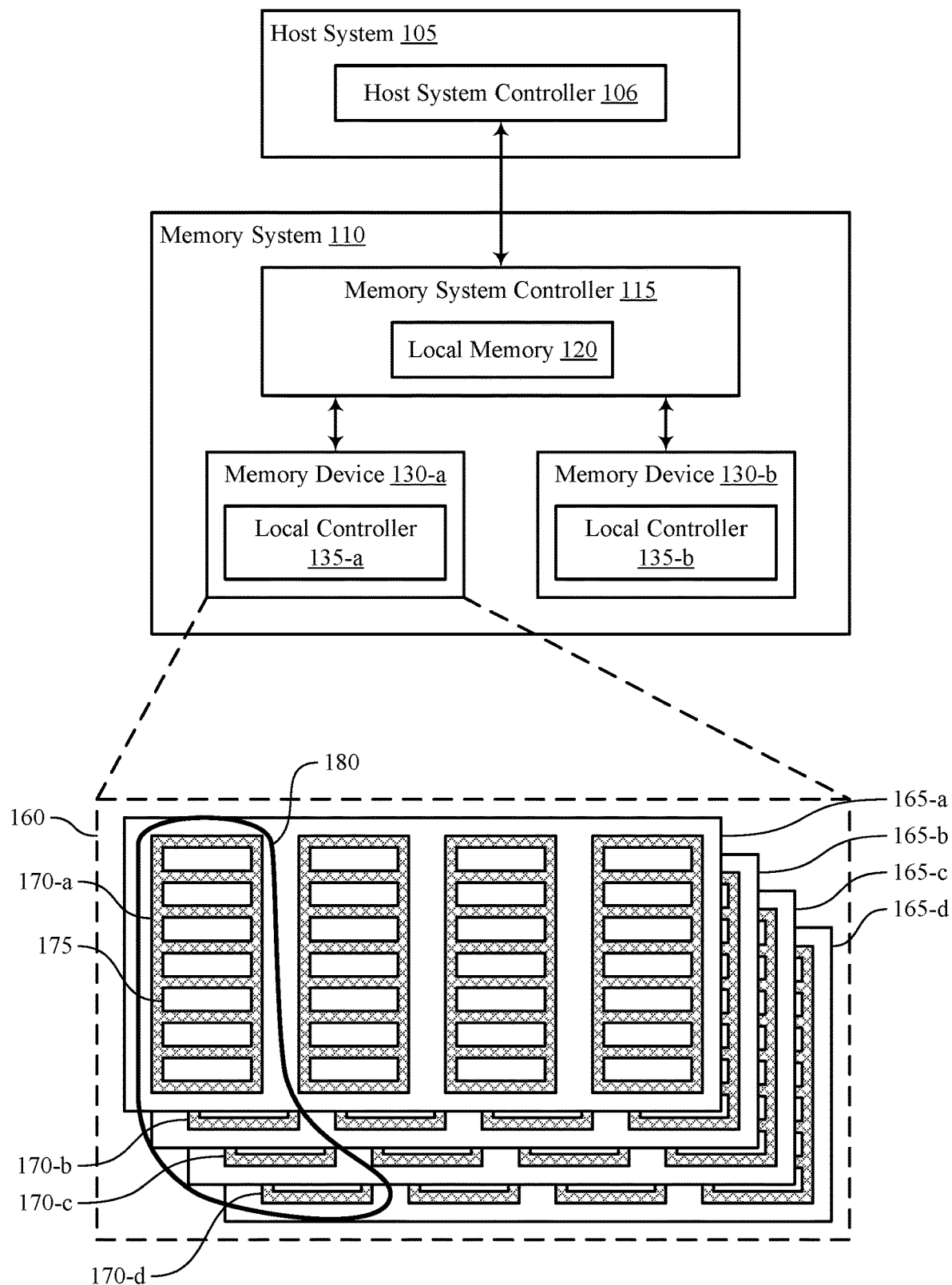
FIG. 1 illustrates an example of a system that supports multi-host communications in accordance with examples as disclosed herein.
Figure 2:
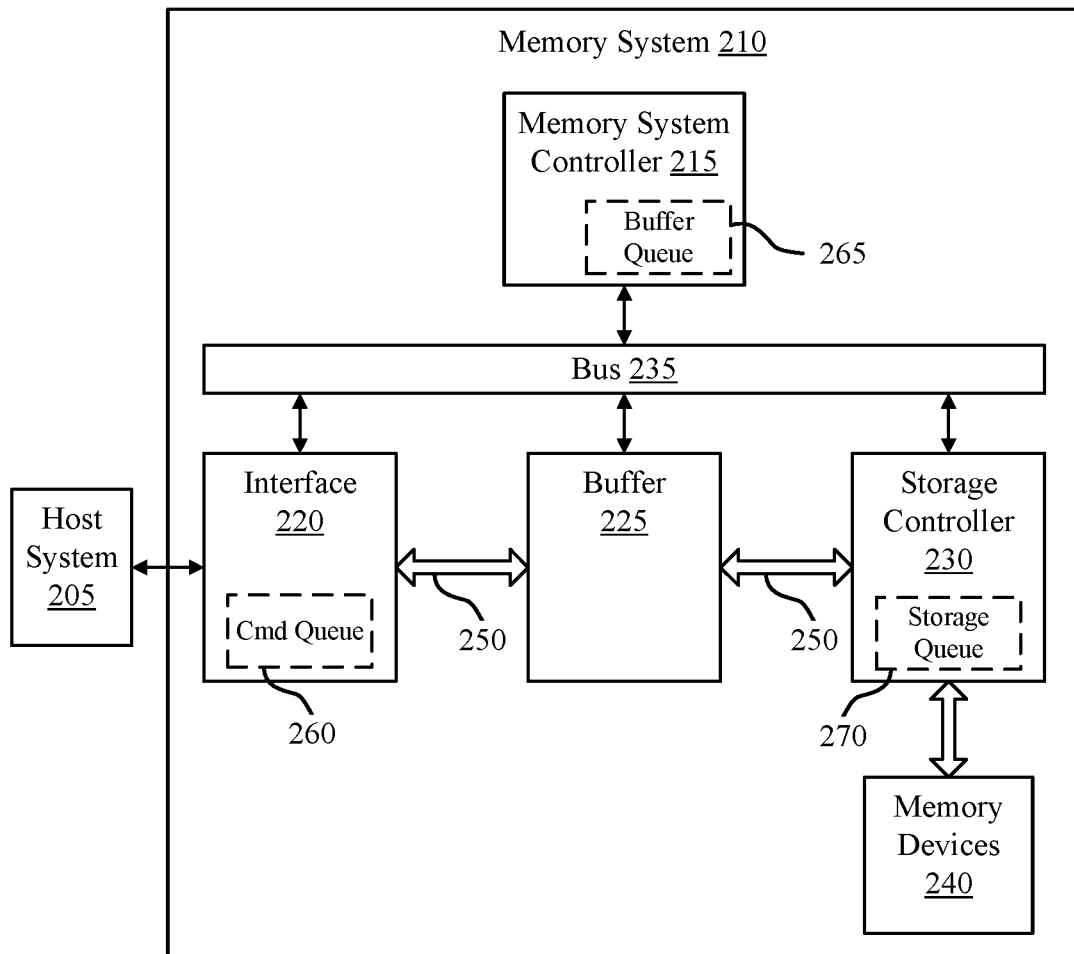
FIG. 2 illustrates an example of a system that supports multi-host communications in accordance with examples as disclosed herein.

Features of the disclosure are initially described in the context of systems, devices, and circuits with reference to FIGS. 1 and 2. Features of the disclosure are described in the context of systems and process flow diagrams with reference to FIGS. 3 and 4. These and other features of the disclosure are further illustrated by and described in the context of an apparatus diagram and flowchart that relate to multi-host communications with reference to FIGS. 5 through 8.

FIG. 1 illustrates an example of a system 100 that supports multi-host communications in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof.

Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that supports multi-host communications. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some examples, the memory system 110 may be coupled with multiple host systems 105 (not shown). The memory system 110 may include a buffer (or multiple buffers) that are accessible by the host systems 105. For example, the memory system 110 may include a first buffer (or a first partition of a buffer; not shown) coupled with the host system 105, a second buffer (or a second partition of a buffer; not shown) coupled with a second host system (not shown), and so on. The host system 105 may have both read and write access to a buffer that is coupled with and may have read access to buffers coupled with other host systems. Accordingly, when a write operation is initiated by the host system 105, data may be written to the first buffer and the second host system (not shown) may be able to read the data written to the first buffer. By utilizing such an architecture, multiple host systems may access the memory system 110 using a SDFS while communicating with each other absent a TCP/IP connection and without locking an entire shared namespace, which may improve the overall performance and efficiency of the memory system 110.

FIG. 2 illustrates an example of a system 200 that supports multi-host communications in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types.

In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In some examples, the memory system 210 may be coupled with multiple host systems 205 (not shown). The memory system 210 may include a buffer 225 (or multiple buffers 225; not shown) that are accessible by the host systems 205. For example, the memory system 210 may include a buffer 225 (or a first partition of the buffer 225) coupled with the host system 205, a second buffer (or a second partition of the buffer 225) coupled with a second host system (not shown), and so on. The host system 205 may have both read and write access to a buffer that is coupled with and may have read access to buffers coupled with other host systems. Accordingly, when a write operation is initiated by the host system 205, data may be written to the first buffer and the second host system (not shown) may be able to read the data written to the first buffer. By utilizing such an architecture, multiple host systems may access the memory system 210 using a SDFS (or any file system or non-file based system) while communicating with each other absent a TCP/IP connection and without locking an entire shared namespace, which may improve the overall performance and efficiency of the memory system 210.

Figure 3:
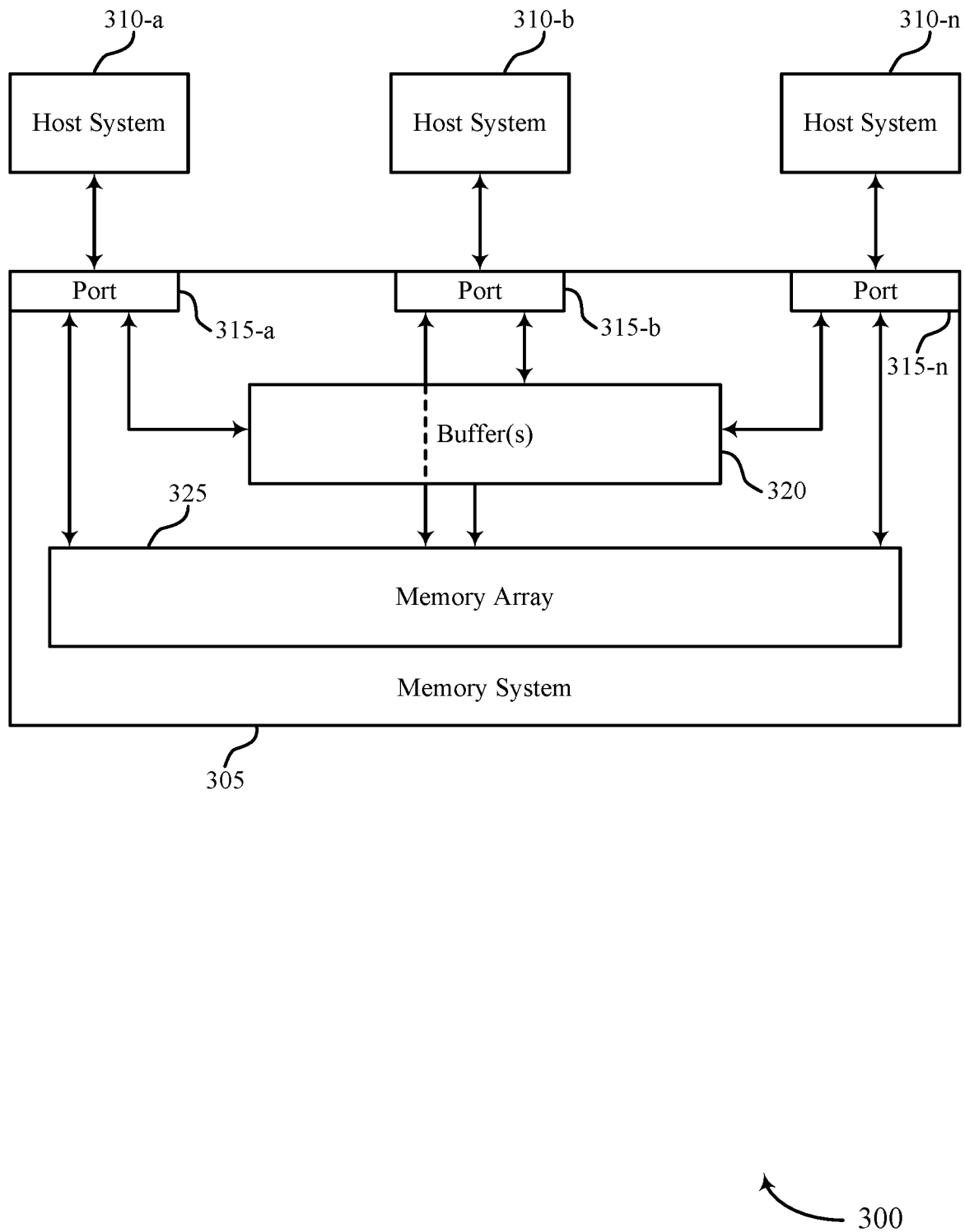
FIG. 3 illustrates an example of a system that supports multi-host communications in accordance with examples as disclosed herein.

FIG. 3 illustrates an example of a system 300 that supports multi-host communications in accordance with examples as disclosed herein. In some examples, the system 300 may include a memory system 305 that is coupled with one or more host systems 310. The memory system 305 may include one or more buffers 320 that is coupled with the host systems, and a memory array 325 that is shared by the host systems 310. As described herein, the host systems 310 may access the memory array 325 using a SDFS (or any file system or non-file based system). Because the host systems 310 may communicate through the buffer 320 (or buffers) of the memory system 305, each host system 310 may access the memory system 305 using a SDFS while communicating with each other without a host-to-host communication link (e.g., a TCP/IP connection) and without locking an entire shared namespace, which may improve the overall performance and efficiency of the memory system 305. Additionally or alternatively, the host systems 310 may use the buffer 320 (or buffers) for synchronization or any other communication requirements of the SDFS (or non-SDFS) without requiring a host-to-host communication link (e.g., a TCP/IP connection).

The memory system 305 may be coupled with a first host system 310-*a*, a second host system 310-*b*, and a third host system 310-*n*. Although the memory system 305 is shown as being coupled with three (3) host systems 310, the memory system 305 may be coupled with any quantity of host systems 305 (e.g., two, three, four, five, six, seven, eight host systems, or more). In some instances, each host system 310 may include its own processing capabilities and may be associated with a respective component or portion of an environment. For example, each host system 310 may be associated with a different component of a vehicle, such as different components or portions of an infotainment system.

The host systems 310 may be coupled with the memory system 305 via respective ports 315. For example, the first host system 310-*a* may be coupled with a first port 315-*a* of the memory system 305, the second host system 310-*b* may be coupled with a second port 315-*b* of the memory system 305, and the third host system 310-*n* may be coupled with a third port 315-*n* of the memory system 305. Thus the memory system 305 may include at least a same quantity of ports 315 as host systems 310 that it is coupled with.

Additionally or alternatively, the memory system 305 may include a memory array 325 (or multiple memory arrays 325) that are accessible by the host systems 310. For example, the memory system 305 may utilize a SDFS (or any file system or non-file based system) where each host system 310 is able to access the memory array 325 using a same file system (e.g., a shared file system). However, in some instances, the host systems 310 may be able to communicate with each other (e.g., communicate between host system 310-a, host system 310-b, etc.) using the memory system 305 for communications unrelated to shared file system access or shared drive access.

In some instances, the memory array 325 (or the memory arrays 325) may include at least one namespace that is shared by each of the host systems 310. As used herein, a namespace may refer to an address (or a range of addresses) of the memory array(s) 325. The address (or range of addresses) may be independently accessible by each host system 310, and the synchronization in accessing the address (or range of addresses) may be facilitated by the buffer(s) 320 and communication protocol described herein.

The memory system 305 may include one or more buffers 320. In the instance where the memory system 305 includes a single buffer 320, the buffer 320 may be partitioned such that each host system 310 has write access to a respective partition. In the instance where the memory system 305 includes multiple buffers 320, each host system 310 may be coupled with a respective buffer to which it has write access. Additionally or alternatively, each host system 310 may have read access to a buffer 320 (or a partition of a buffer 320) that is coupled with a different host system 310.

For example, the first host system 310-a may have read and write access to a first buffer (or to a first partition of the buffer 320), the second host system 310-b may have read and write access to a second buffer (or to a second partition of the buffer 320), and the third host system 310-n may have read and write access to a third buffer (or to a third partition of the buffer 320). Further, the first host system 310-a may have read access to the second buffer (or to the second partition of the buffer 320) and the third buffer (or to the third partition of the buffer 320) and so on. Such access may allow for synchronization between the host systems 310 during access operations (e.g., during write operations).

The memory system 305 may also include at least one register (not shown) and at least one memory system controller (e.g., at least one memory system controller 215 as described with reference to FIG. 1; not shown). In some examples, the memory system controller may communicate with the host systems 310, the buffer(s) 320, and the memory array 325. For example, the memory system controller may receive a write command from a host system 310 and may write data to a respective buffer (or to a respective partition of the buffer 320).

In some instances, the write command (or another command associated with the write command) may indicate a target host system. That is, for example, the first host system 310-a may transmit a write command to the memory system 305 with an indication that the second host system 310-b is the target host system. As used herein, a target host system may refer to a host system 310 for which data is intended to be transferred to (e.g., the intended recipient of the message). In some instances, the memory system controller may write an indication of the target host system 310 (or the target host systems 310) to the register, and one or more host systems 310 may receive an interrupt signal based on the indication being written to the register.

For example, the host systems 310 may utilize an interrupt method or a polling method to receive an indication of a target host system 310. When using a polling method, each host system 310 may include a timer (or a component having a timer). When the timer expires, the host system 310 may poll the register. If the register includes an indication that the particular host system 310 (e.g., the host system 310 reading the register) is a target host system 310, the host system 310 may cease performing any ongoing operations and read the buffer (or the respective partition of the buffer 320) of the designating host system 310.

When using an interrupt method, the memory system controller may write an indication to the register and may transmit signaling (e.g., an interrupt signal) to the target host system 310. The host system 310 may read the contents of the register based on receiving the signaling and may cease performing any ongoing operations based on the register including an indication that it is the target host system. Accordingly, the host system 310 may cease performing any ongoing operations and read the buffer (or the respective partition of the buffer 320) of the designating host system 310.

In other examples, a designating host system (e.g., first host system 310-a) may transmit an interrupt signal directly to the target host system (e.g., second host system 310-b). The interrupt signal may instruct the target host system to cease performing any ongoing operations and read the buffer (or the respective partition of the buffer 320) of the designating host system. The type of interrupt method or interrupt signaling may be selected as a matter of design choice or based on one or more parameters or performance characteristics of the memory system 305.

Additionally or alternatively, the memory system 305 may utilize either a unicast, a broadcast, or a multicast interrupt method. For example, the first host system 310-a may transmit a write command to the memory system 305, and data may be written to the first buffer (or to the respective first partition of the buffer 320). When utilizing a unicast interrupt, an interrupt signal may be transmitted to the second host system 310-b and the second host system 310-b may read the contents of the register based on receiving the signaling. When utilizing a multicast interrupt, an interrupt signal may be transmitted to the second host system 310-b and the third host system 310-n, and the second host system 310-b and third host system 310-n may each read the contents of the register based on receiving the signaling. Lastly, when utilizing a broadcast interrupt, an interrupt signal may be transmitted to each host system 310 (e.g., a plurality of host systems 310; more than two host systems 310), and each host system 310 may read the contents of the register based on receiving the signaling.

When a target host system 310 reads the contents of the register and ceases performing any ongoing operations, the target host system 310 (or target host systems 310) may read the buffer (or the respective partition of the buffer 320) of the designating host system 310. As described herein, the target host system 310 may read the data from the buffer of the designating host system 310. Accordingly, the target host system 310 may obtain data from the designating host system 310 without the entire shared namespace (or without a relatively large portion of the shared namespace) of the memory array 325 being locked and absent a TCP/IP connection (or other, similar connection type) between the host systems 310.

After reading the buffer of the designating host system 310, the target host system may write an acknowledgement (ACK) message to its buffer (or to its partition of the buffer 320) and the designating host system 310 may receive an indication of such (e.g., an interrupt). The designating host system may read the interrupt from the buffer and may erase the data from its buffer or may make the data as invalid and allow it to be overwritten.

By way of example, the first host system 310-*a* may transmit a first write command (e.g., the first host system 310-*a* may transmit first data) to the memory system 305. The first data may be intended for the second host system 310-*b*. The memory system controller (not shown) may write the first data to a first buffer and may write an indication, to the register (not shown), that the second host system 310-*b* is the target host system 310-*b*. Because the memory system 305 may utilize a unicast interrupt method, the memory system controller may also transmit signaling (e.g., an interrupt signal) to the second host system 310-*b*. The second host system 310-*b* may cease performing any ongoing operations (e.g., read operations, write operations) based on receiving the signaling.

The second host system 310-*b* may read the contents of the register based on receiving the signaling. Because the register may include an indication that the second host system 310-*b* is the target host system 310-*b* for the data written to the first buffer, the second host system 310-*b* may read the first data from the first buffer. In some instances, the memory system controller may read the first data and may transmit the first data to the second host system 310-*b*.

Upon reading the first data, the second host system may write an ACK to its buffer (e.g., to a second buffer). The second host system 310-*b* (or the memory system controller) may transmit signaling (e.g., an interrupt signal) to the first host system 310-*a*, which may cease performing any ongoing operations (e.g., read operations, write operations) based on receiving the signaling. The first host system 310-*a* may read the ACK from the second buffer and may erase the data stored to the first buffer. Because the host systems 310 described herein may access the memory system 305 and use the communications described herein for synchronizing access to the memory array 325 without requiring a TCP/IP connection and without locking an entire shared namespace, the overall performance and efficiency of the memory system 305 may be improved.

Figure 4:
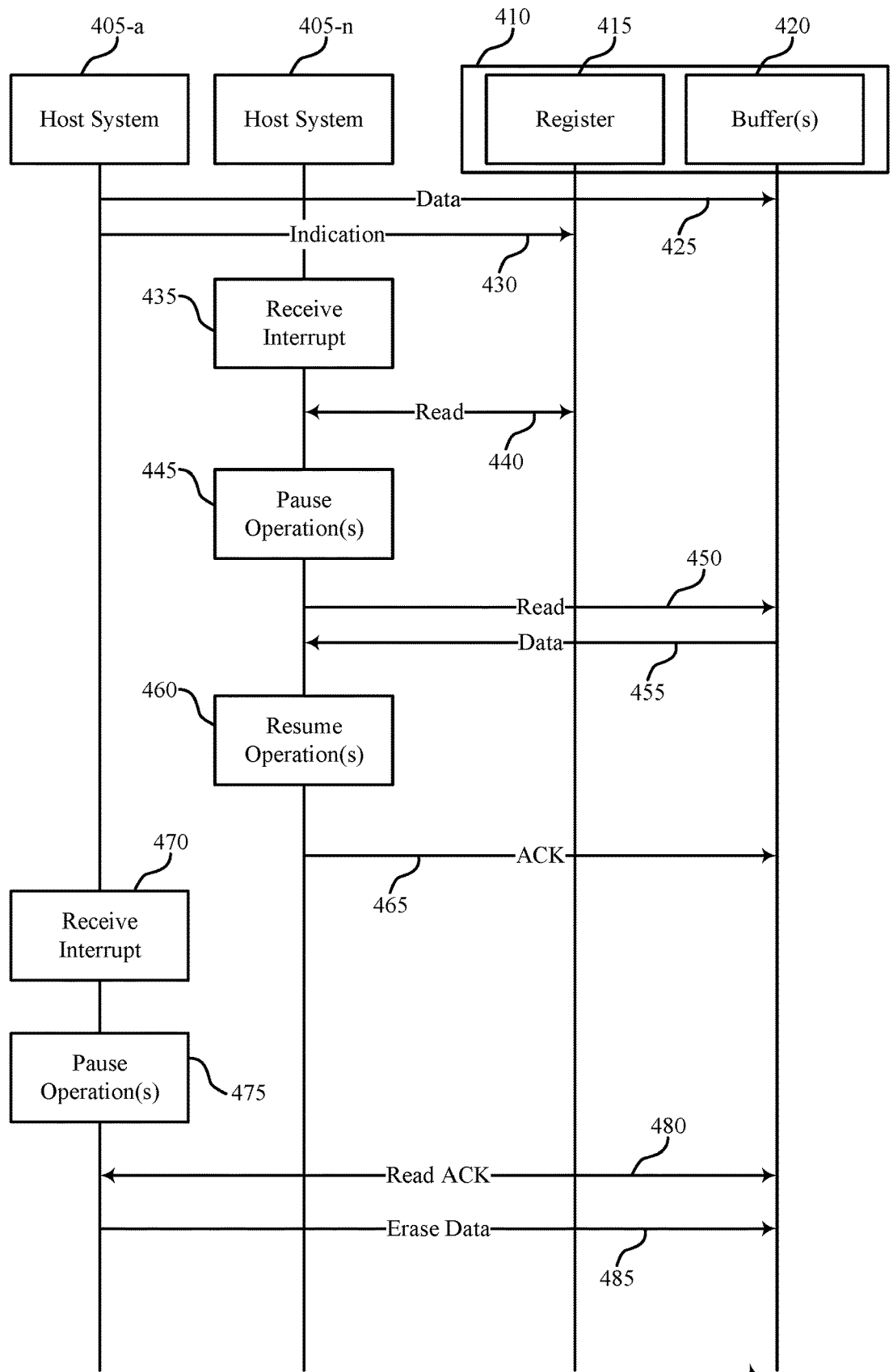
FIG. 4 illustrates an example of a process flow diagram that supports multi-host communications in accordance with examples as disclosed herein.

FIG. 4 illustrates an example of a process flow diagram 400 that supports multi-host communications in accordance with examples as disclosed herein. In some examples, the process flow diagram 400 illustrates operations performed at or by a host system 405-*a*, a host system 405-*n*, and a memory system 410. In some instances, the memory system 410 may include one or more registers 415 and one or more buffers 420. As described herein, the host systems 405 may access the memory system 410 using a SDFS (or any file system or non-file based system). Because the host systems 405 may communicate with each other using the buffer(s) 420 of the memory system 410, the host systems 405 may use the buffer(s) 420 for synchronization of SDFS (or any other mechanisms) without requiring a TCP/IP connection and without locking an entire shared namespace, which may improve the overall performance and efficiency of the memory system 410.

Aspects of the process flow diagram 400 may be implemented by a controller (e.g., the memory system controller 215 as described with reference to FIG. 2), among other components. Additionally, or alternatively, aspects of the process flow diagram 400 may be implemented as instructions stored in memory (e.g., firmware stored in a memory coupled with a controller). For example, the instructions, in response to being executed by a controller (e.g., the memory system controller 215), may cause the controller to perform the operation of the process flow diagram 400.

At 425, the host system 405-*a* may transmit data to a first buffer 420 of the memory system 410. As described herein, the first buffer 420 may be a standalone buffer coupled with the host system 405-*a*, or may be a dedicated partition of a shared buffer. In some instances, the data may be transmitted as part of a write command and may be processed by a memory system controller (e.g., the memory system controller may write the first data to the first buffer 420).

At 430, the host system may transmit an indication to the memory system 410 that the host system 405-*n* is the target host system. In some instances, the indication may be transmitted as part of the write command (e.g., with the data) and may be processed by a memory system controller (e.g., the memory system controller may write the indication to the register 415).

At 435, the host system 405-*n* may receive an interrupt signal. The interrupt signal may be based on the indication being written to the register 415. At 440, the host system 405-*n* may read the contents of the register 415 based on receiving the interrupt. As described herein, the contents of the register 415 may indicate, to the host system 405-*n*, that the host system 405-*n* is the target host system.

At 445, the host system 405-*n* may pause any ongoing operations. For example, the operations may include read operations, write operations, background operations, maintenance operations, or any other type of operations. Moreover, the operations may be paused (e.g., suspended) for a duration, which may be set as a matter of design choice or based on one or more parameters or performance characteristics of the memory system 410. In other examples (not shown), the host system 405-*n* may pause any ongoing operations based on receiving the interrupt (e.g., at 435) and may read the contents of the register 415 (e.g., at 440) after pausing any ongoing operations.

At 450, the host system 405-*n* may transmit a read command to the memory system 410. In some examples, the read command may be transmitted to a memory system controller or directly to the first buffer 420.

At 455, the data (e.g., the data transmitted at 425) may be transmitted from the first buffer 420 to the host system 405-*n*. In some instances, the data may be read by a memory system controller and subsequently transmitted to the host system 405-*n*.

At 460, the host system 405-*n* may resume any operations that were previously paused (e.g., at 445). That is, at 460, the duration may have elapsed and the host system 405-*n* may resume performing existing and new operations.

At 465, the host system 405-*n* may transmit an acknowledgement message (e.g., an ACK) to a second buffer 420 of the memory system 410. As described herein, the second buffer 420 may be a standalone buffer coupled with the host system 405-*n*, or may be a dedicated partition of a shared buffer. In some instances, the ACK may be processed by a memory system controller (e.g., the memory system controller may write the ACK to the second buffer 420).

At 470, the host system 405-*a* may receive an interrupt signal. The interrupt signal may be based on the ACK being written to the second buffer 420. At 475, the host system 405-*a* may pause any ongoing operations. For example, the operations may include read operations, write operations, background operations, maintenance operations, or any other type of operations. Moreover, the operations may be paused (e.g., suspended) for a second duration, which may be set as a matter of design choice or based on one or more parameters or performance characteristics of the memory system 410.

At 480, the host system 405-a may read the ACK from the second buffer 420. In some examples, the host system 405-a may read the ACK by transmitting a read command to the memory system 410 (e.g., to the memory system controller), and the memory system controller may read the ACK from the second buffer 420 and may transmit the ACK to the host system 405-a.

At 485, the host system 405-a may erase the data (e.g., the data transmitted at 425) from the first buffer 420 or may make the data as invalid and allow it to be overwritten. The data may be erased based on the ACK, which may have acknowledged (e.g., to the host system 405-a) that the data was read by the target host system (e.g., by the host system 405-n). Because the host systems 405 may communicate with each other using the buffer(s) 420 of the memory system 410, the host system s405 may use the buffer(s) 420 for synchronization of SDFS or any other mechanisms without requiring a TCP/IP connection and without locking an entire shared namespace, which may improve the overall performance and efficiency of the memory system 410.

Figure 5:
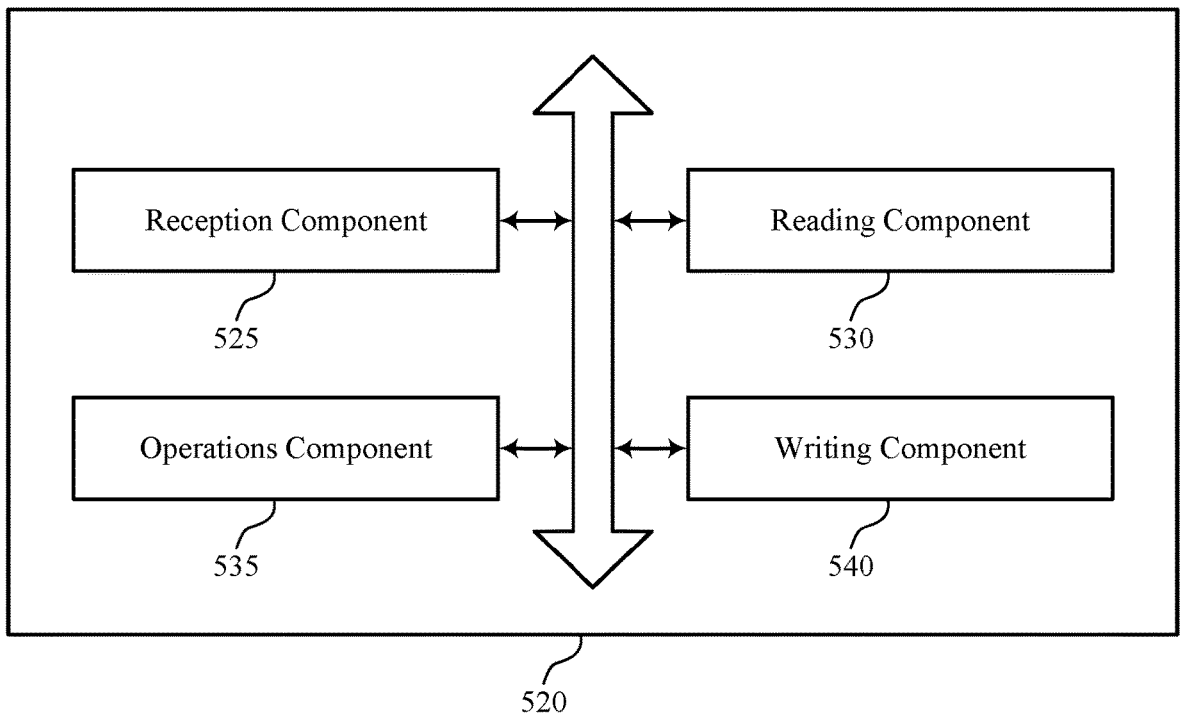
FIGS. 5 and 6 shows block diagrams of systems that support multi-host communications in accordance with examples as disclosed herein.

FIG. 5 shows a block diagram 500 of a system 520 that supports multi-host communications in accordance with examples as disclosed herein. The system 520 may be an example of aspects of a host system as described with reference to FIGS. 1 through 4. The system 520, or various components thereof, may be an example of means for performing various aspects of multi-host communications as described herein. For example, the system 520 may include a transmission component 525, a reception component 530, a reading component 535, a writing component 540, a memory operations component 545, an erasing component 550, or any combination thereof. Each of these components may communicate, directly or indirectly, with one another (e.g., via one or more buses).

The transmission component 525 may be configured as or otherwise support a means for transmitting, by a first host system, data to a buffer of a memory system, where the first host system has write access and read access to the buffer and a second host system has read access to the buffer. The reception component 530 may be configured as or otherwise support a means for receiving, by the second host system, an interrupt signal based at least in part on the first host system transmitting the data to the buffer. The reading component 535 may be configured as or otherwise support a means for reading, by the second host system, the data from the buffer of the memory system based at least in part on receiving the interrupt signal.

In some examples, the writing component 540 may be configured as or otherwise support a means for writing, by the first host system, an indication to a register of the memory system that the second host system is a target host system for the data written to the buffer, where receiving the interrupt signal by the second host system is based at least in part on the first host system writing the indication to the register.

In some examples, the reading component 535 may be configured as or otherwise support a means for reading, by the second host system, the register based at least in part on receiving the interrupt signal, where the data is read from the buffer by the second host system based at least in part on the second host system reading the register.

In some examples, the indication that the second host system is the target host system indicates that the first host system designated the second host system as the target host system.

In some examples, the memory operations component 545 may be configured as or otherwise support a means for refraining, by the second host system, from performing one or more ongoing operations for a duration based at least in part on receiving the interrupt signal, where the data is read from the buffer by the second host system during at least a portion of the duration.

In some examples, the memory operations component 545 may be configured as or otherwise support a means for resuming, by the second host system, performing one or more operations after the duration.

In some examples, the data is written to the buffer by the first host system according to a file system of the memory system. In some examples, the data is read from the buffer by the second host system according to the file system of the memory system.

In some examples, the data written to the buffer by the first host system is associated with a communication different than shared drive access or shared file system access associated with the memory system.

In some examples, the reception component 530 may be configured as or otherwise support a means for receiving, by a third host system, the interrupt signal based at least in part on the first host system transmitting the data to the buffer. In some examples, the reading component 535 may be configured as or otherwise support a means for reading, by the third host system, the data from the buffer of the memory system based at least in part on receiving the interrupt signal.

In some examples, the reception component 530 may be configured as or otherwise support a means for receiving, by a fourth host system, the interrupt signal based at least in part on the first host system transmitting the data to the buffer. In some examples, the reading component 535 may be configured as or otherwise support a means for reading, by the fourth host system, the data from the buffer of the memory system based at least in part on receiving the interrupt signal, where at least one of the third host system and the fourth host system includes a virtual host system.

In some examples, the reception component 530 may be configured as or otherwise support a means for receiving, by each host system of a plurality of host systems coupled with the memory system, the interrupt signal based at least in part on the first host system transmitting the data to the buffer. In some examples, the reading component 535 may be configured as or otherwise support a means for reading, by each of the plurality of host systems, the data from the buffer of the memory system based at least in part on receiving the interrupt signal.

In some examples, the writing component 540 may be configured as or otherwise support a means for writing, by the second host system, an acknowledgement message to a second buffer of the memory system, where the second host system has write access and read access to the second buffer and the first host system has read access to the second buffer. In some examples, the reception component 530 may be configured as or otherwise support a means for receiving, by the first host system, a second interrupt signal based at least in part on the second host system writing the acknowledgement message to the second buffer. In some examples, the reading component 535 may be configured as or otherwise support a means for reading, by the first host system, the acknowledgement message from the second buffer of the memory system based at least in part on receiving the second interrupt signal.

In some examples, the erasing component 550 may be configured as or otherwise support a means for erasing, by the first host system, the data from the buffer of the memory system based at least in part on reading the acknowledgement message from the second buffer of the memory system.

Figure 6:
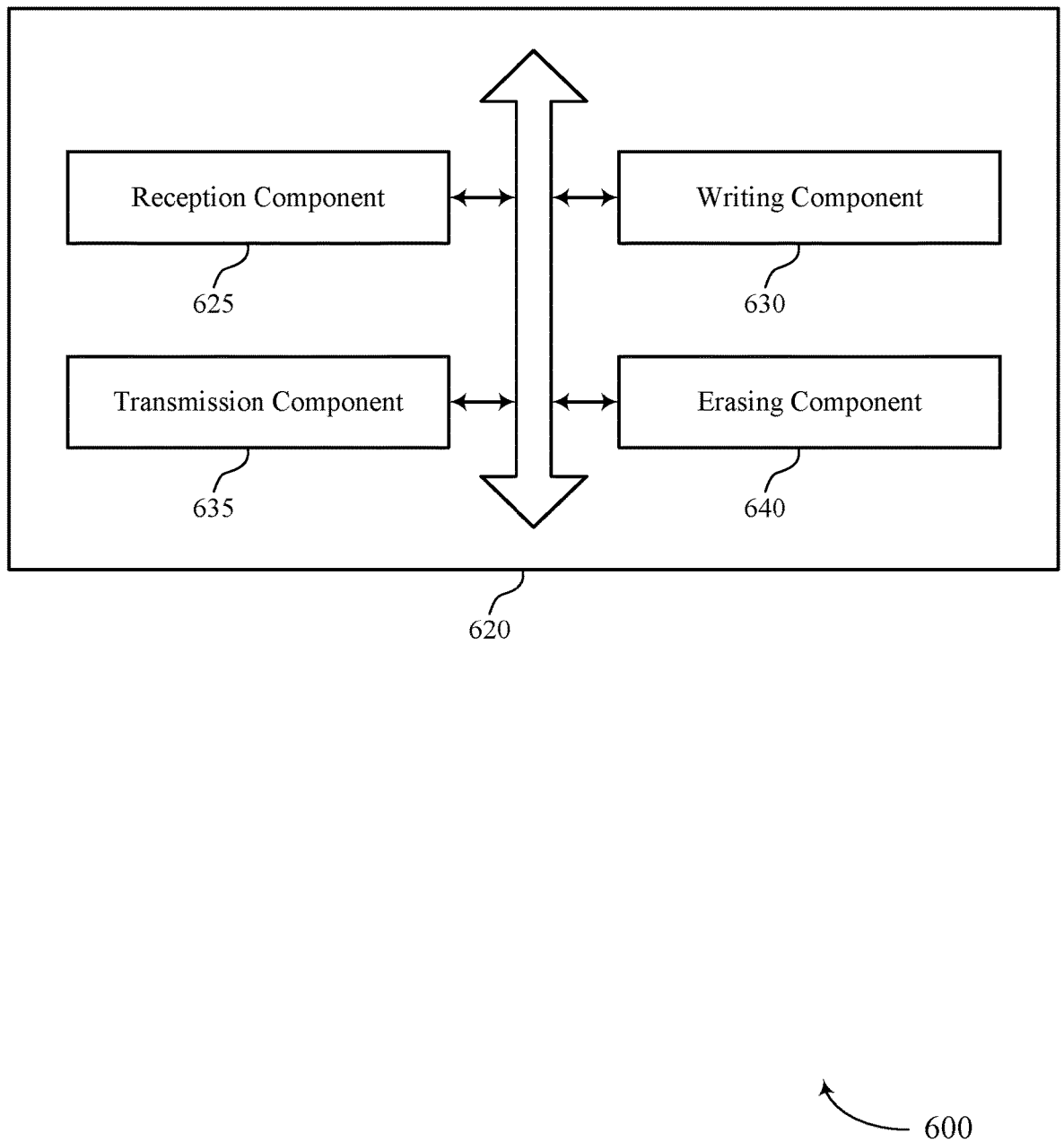

FIG. 6 shows a block diagram 600 of a system 620 that supports multi-host communications in accordance with examples as disclosed herein. The system 620 may be an example of aspects of a memory system as described with reference to FIGS. 1 through 4. The system 620, or various components thereof, may be an example of means for performing various aspects of multi-host communications as described herein. For example, the system 620 may include a reception component 625, a writing component 630, a transmission component 635, an erasing component 640, or any combination thereof. Each of these components may communicate, directly or indirectly, with one another (e.g., via one or more buses).

The reception component 625 may be configured as or otherwise support a means for receiving, by a memory system from a first host system, a first message for a second host system coupled with the memory system. The writing component 630 may be configured as or otherwise support a means for writing, by the memory system, the first message to a buffer of the memory system based at least in part on receiving the first message, where the first host system has write access and read access to the buffer and the second host system has read access to the buffer. The transmission component 635 may be configured as or otherwise support a means for transmitting, to the second host system, an interrupt signal based at least in part on writing the first message to the buffer. In some examples, the transmission component 635 may be configured as or otherwise support a means for transmitting the first message from the buffer of the memory system to the second host system based at least in part on transmitting the interrupt signal.

In some examples, the reception component 625 may be configured as or otherwise support a means for receiving, by a register the memory system from the first host system, an indication that the second host system is a target host system for the first message written to the buffer, where transmitting the interrupt signal is based at least in part on the first host system writing the indication.

In some examples, the transmission component 635 may be configured as or otherwise support a means for transmitting the indication to the second host system based at least in part on transmitting the interrupt signal, where reading the first message is based at least in part on transmitting the indication.

In some examples, the indication that the second host system is the target host system indicates that the first host system designated the second host system as the target host system.

In some examples, the first message is written to the buffer according to a file system of the memory system. In some examples, the first message is transmitted from the buffer according to the file system of the memory system.

In some examples, the transmission component 635 may be configured as or otherwise support a means for transmitting, by the memory system to a third host system, the interrupt signal based at least in part on writing the first message to the buffer. In some examples, the transmission component 635 may be configured as or otherwise support a means for transmitting, by the memory system to the third host system, the first message from the buffer based at least in part on transmitting the interrupt signal.

In some examples, the transmission component 635 may be configured as or otherwise support a means for transmitting, by the memory system to a fourth host system, the interrupt signal based at least in part on writing the first message to the buffer. In some examples, the transmission component 635 may be configured as or otherwise support a means for transmitting, by the memory system to the fourth host system, the first message from the buffer based at least in part on transmitting the interrupt signal, where at least one of the third host system and the fourth host system includes a virtual host system.

In some examples, the transmission component 635 may be configured as or otherwise support a means for transmitting, by the memory system to each host system of a plurality of host systems coupled with the memory system, the interrupt signal based at least in part on the writing the first message to the buffer. In some examples, the transmission component 635 may be configured as or otherwise support a means for transmitting, by the memory system to each host system of the plurality of host systems, the first message from the buffer based at least in part on transmitting the interrupt signal.

In some examples, the reception component 625 may be configured as or otherwise support a means for receiving, from the second host system, an acknowledgement message of the first message. In some examples, the writing component 630 may be configured as or otherwise support a means for writing, by the memory system, the acknowledgement message to a second buffer of the memory system based at least in part on receiving the acknowledgement message, where the second host system has write access and read access to the second buffer and the first host system has read access to the second buffer. In some examples, the transmission component 635 may be configured as or otherwise support a means for transmitting, by the memory system to the first host system, a second interrupt signal based at least in part on the acknowledgement message. In some examples, the transmission component 635 may be configured as or otherwise support a means for transmitting, by the memory system to the first host system, the acknowledgement message from the second buffer of the memory system based at least in part on transmitting the second interrupt signal.

In some examples, the erasing component 640 may be configured as or otherwise support a means for erasing, by the memory system, the first message from the buffer of the memory system based at least in part on transmitting the acknowledgement message from the second buffer of the memory system.

Figure 7:
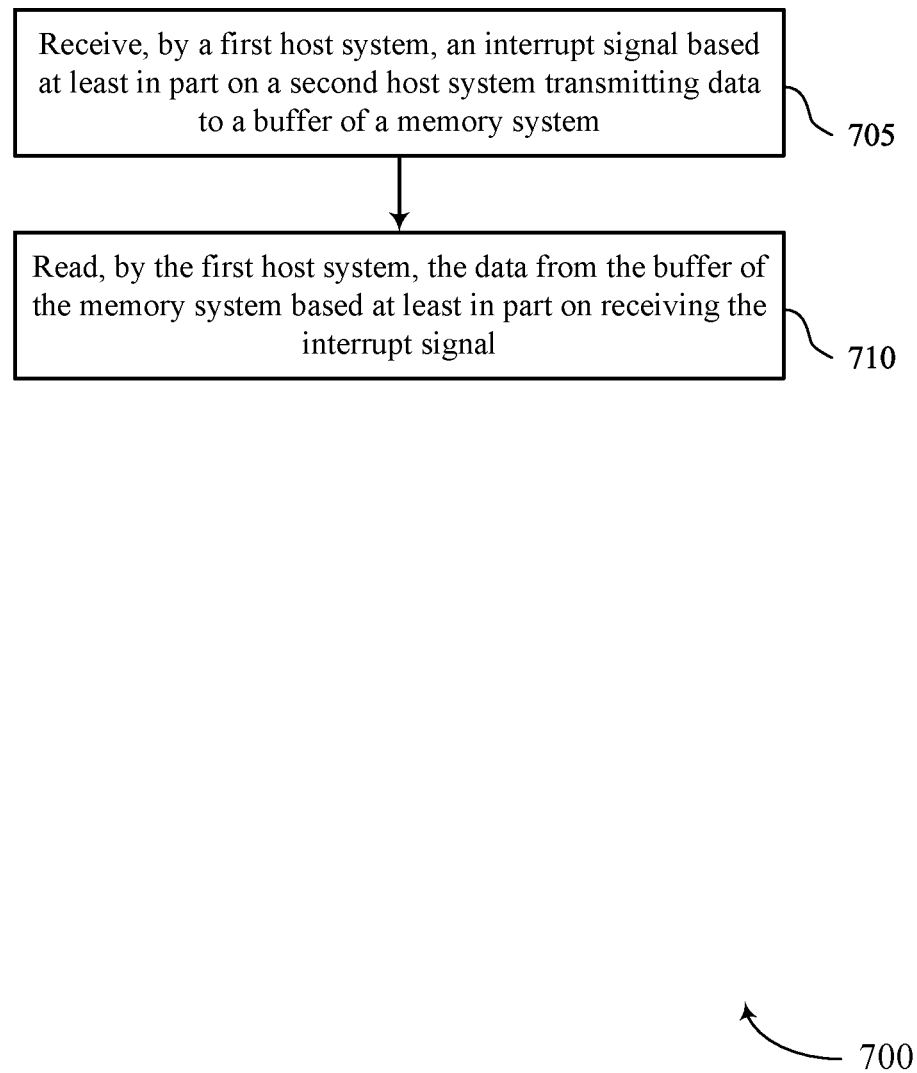
FIGS. 7 and 8 show flowcharts illustrating a method or methods that support multi-host communications in accordance with examples as disclosed herein.

FIG. 7 shows a flowchart illustrating a method 700 that supports multi-host communications in accordance with examples as disclosed herein. The operations of method 700 may be implemented by a host system or its components as described herein. For example, the operations of method 700 may be performed by a host system as described with reference to FIGS. 1 through 5. In some examples, a host system may execute a set of instructions to control the functional elements of the device to perform the described functions. Additionally, or alternatively, the host system may perform aspects of the described functions using special-purpose hardware.

At 705, the method may include transmitting, by a first host system, data to a buffer of a memory system, where the first host system has write access and read access to the buffer and a second host system has read access to the buffer. The operations of 705 may be performed in accordance with examples as disclosed herein. In some examples, aspects of the operations of 705 may be performed by a transmission component 525 as described with reference to FIG. 5.

At 710, the method may include receiving, by the second host system, an interrupt signal based at least in part on the first host system transmitting the data to the buffer. The operations of 710 may be performed in accordance with examples as disclosed herein. In some examples, aspects of the operations of 710 may be performed by a reception component 530 as described with reference to FIG. 5.

At 715, the method may include reading, by the second host system, the data from the buffer of the memory system based at least in part on receiving the interrupt signal. The operations of 715 may be performed in accordance with examples as disclosed herein. In some examples, aspects of the operations of 715 may be performed by a reading component 535 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for transmitting, by a first host system, data to a buffer of a memory system, where the first host system has write access and read access to the buffer and a second host system has read access to the buffer; receiving, by the second host system, an interrupt signal based at least in part on the first host system transmitting the data to the buffer; and reading, by the second host system, the data from the buffer of the memory system based at least in part on receiving the interrupt signal.

Aspect 2: The method, apparatus, or non-transitory computer-readable medium of aspect 1, further including operations, features, circuitry, logic, means, or instructions, or any combination thereof for writing, by the first host system, an indication to a register of the memory system that the second host system is a target host system for the data written to the buffer, where receiving the interrupt signal by the second host system is based at least in part on the first host system writing the indication to the register.

Aspect 3: The method, apparatus, or non-transitory computer-readable medium of aspect 2, further including operations, features, circuitry, logic, means, or instructions, or any combination thereof for reading, by the second host system, the register based at least in part on receiving the interrupt signal, where the data is read from the buffer by the second host system based at least in part on the second host system reading the register.

Aspect 4: The method, apparatus, or non-transitory computer-readable medium of any of aspects 2 through 3, where the indication that the second host system is the target host system indicates that the first host system designated the second host system as the target host system.

Aspect 5: The method, apparatus, or non-transitory computer-readable medium of any of aspects 1 through 4, further including operations, features, circuitry, logic, means, or instructions, or any combination thereof for refraining, by the second host system, from performing one or more ongoing operations for a duration based at least in part on receiving the interrupt signal, where the data is read from the buffer by the second host system during at least a portion of the duration.

Aspect 6: The method, apparatus, or non-transitory computer-readable medium of aspect 5, further including operations, features, circuitry, logic, means, or instructions, or any combination thereof for resuming, by the second host system, performing one or more operations after the duration.

Aspect 7: The method, apparatus, or non-transitory computer-readable medium of any of aspects 1 through 6, where the data is written to the buffer by the first host system according to a file system of the memory system and the data is read from the buffer by the second host system according to the file system of the memory system.

Aspect 8: The method, apparatus, or non-transitory computer-readable medium of any of aspects 1 through 7, where the data written to the buffer by the first host system is associated with a communication different than shared drive access or shared file system access associated with the memory system.

Aspect 9: The method, apparatus, or non-transitory computer-readable medium of any of aspects 1 through 8, further including operations, features, circuitry, logic, means, or instructions, or any combination thereof for receiving, by a third host system, the interrupt signal based at least in part on the first host system transmitting the data to the buffer and reading, by the third host system, the data from the buffer of the memory system based at least in part on receiving the interrupt signal.

Aspect 10: The method, apparatus, or non-transitory computer-readable medium of aspect 9, further including operations, features, circuitry, logic, means, or instructions, or any combination thereof for receiving, by a fourth host system, the interrupt signal based at least in part on the first host system transmitting the data to the buffer and reading, by the fourth host system, the data from the buffer of the memory system based at least in part on receiving the interrupt signal, where at least one of the third host system and the fourth host system includes a virtual host system.

Aspect 11: The method, apparatus, or non-transitory computer-readable medium of any of aspects 1 through 10, further including operations, features, circuitry, logic, means, or instructions, or any combination thereof for receiving, by each host system of a plurality of host systems coupled with the memory system, the interrupt signal based at least in part on the first host system transmitting the data to the buffer and reading, by each of the plurality of host systems, the data from the buffer of the memory system based at least in part on receiving the interrupt signal.

Aspect 12: The method, apparatus, or non-transitory computer-readable medium of any of aspects 1 through 11, further including operations, features, circuitry, logic, means, or instructions, or any combination thereof for writing, by the second host system, an acknowledgement message to a second buffer of the memory system, where the second host system has write access and read access to the second buffer and the first host system has read access to the second buffer; receiving, by the first host system, a second interrupt signal based at least in part on the second host system writing the acknowledgement message to the second buffer; and reading, by the first host system, the acknowledgement message from the second buffer of the memory system based at least in part on receiving the second interrupt signal.

Aspect 13: The method, apparatus, or non-transitory computer-readable medium of aspect 12, further including operations, features, circuitry, logic, means, or instructions, or any combination thereof for erasing, by the first host system, the data from the buffer of the memory system based at least in part on reading the acknowledgement message from the second buffer of the memory system.

Aspect 14: A method, apparatus, or non-transitory computer-readable medium including operations, features, circuitry, logic, means, or instructions, or any combination thereof for receiving, by a first host system, an interrupt signal based at least in part on a second host system transmitting data to a buffer of a memory system and reading, by the first host system, the data from the buffer of the memory system based at least in part on receiving the interrupt signal.

Aspect 15: The method, apparatus, or non-transitory computer-readable medium of aspect 14, further including operations, features, circuitry, logic, means, or instructions, or any combination thereof for reading, by the first host system, an indication from a register of the memory system that the first host system is a target host system for the data written to the buffer, where receiving the interrupt signal by the first host system is based at least in part on the second host system writing the indication to the register.

Aspect 16: The method, apparatus, or non-transitory computer-readable medium of aspect 15, where the indication that the first host system is the target host system indicates that the second host system designated the first host system as the target host system.

Aspect 17: The method, apparatus, or non-transitory computer-readable medium of any of aspects 13 through 15, further including operations, features, circuitry, logic, means, or instructions, or any combination thereof for refraining, by the first host system, from performing one or more ongoing operations for a duration based at least in part on receiving the interrupt signal, where the data is read from the buffer by the first host system during at least a portion of the duration.

Aspect 18: The method, apparatus, or non-transitory computer-readable medium of aspect 17, further including operations, features, circuitry, logic, means, or instructions, or any combination thereof for resuming, by the first host system, performing one or more operations after the duration.

Aspect 19: The method, apparatus, or non-transitory computer-readable medium of any of aspects 13 through 18, where the data is written to the buffer by the second host system according to a file system of the memory system and the data is read from the buffer by the first host system according to the file system of the memory system.

Aspect 20: The method, apparatus, or non-transitory computer-readable medium of any of aspects 13 through 19, where the data written to the buffer by the second host system is associated with a communication different than shared drive access or shared file system access associated with the memory system.

Aspect 21: The method, apparatus, or non-transitory computer-readable medium of any of aspects 13 through 20, further including operations, features, circuitry, logic, means, or instructions, or any combination thereof for writing, by the first host system, an acknowledgement message to a second buffer of the memory system, where the first host system has write access and read access to the second buffer and the second host system has read access to the second buffer.

Figure 8:
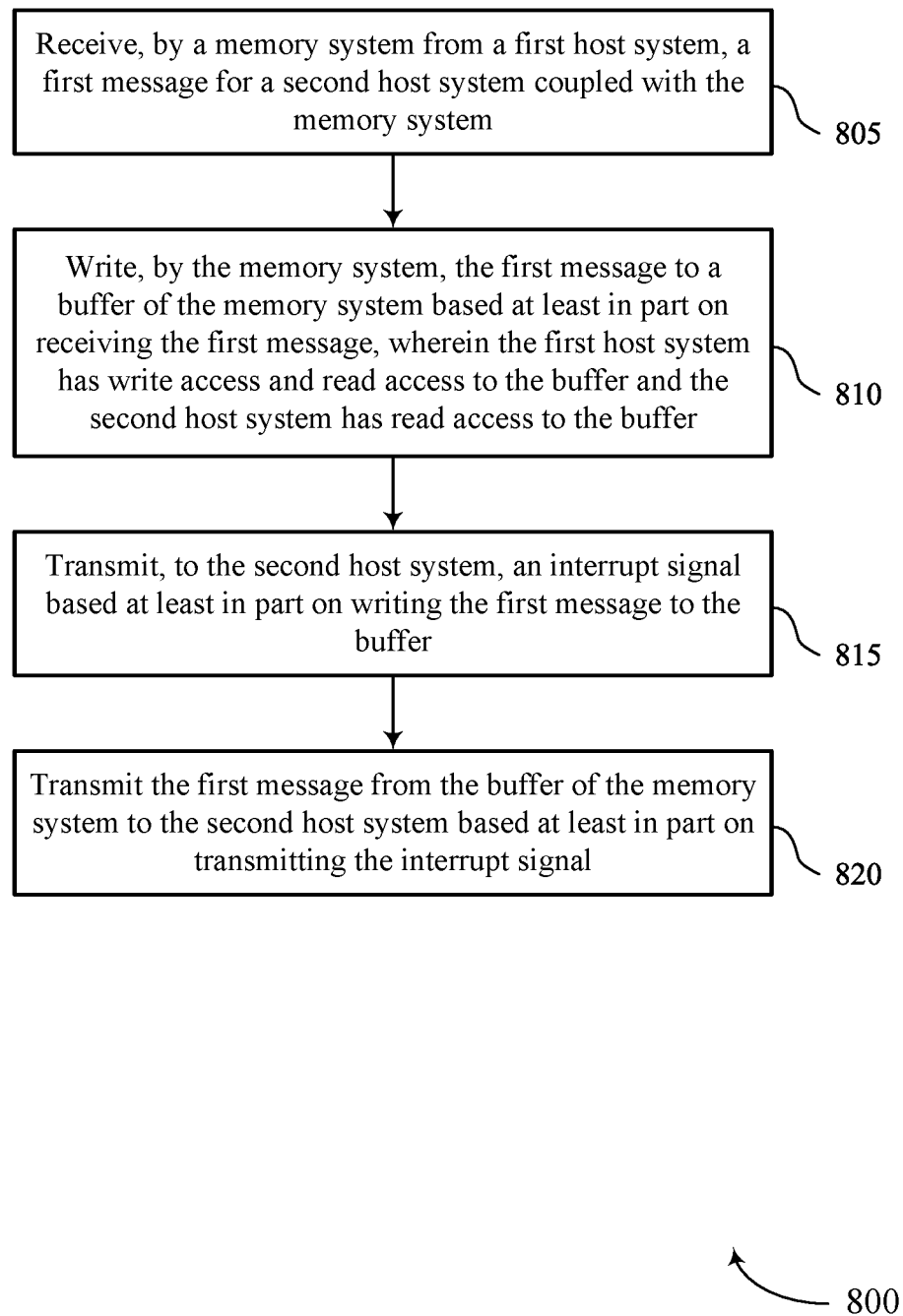

FIG. 8 shows a flowchart illustrating a method 800 that supports multi-host communications in accordance with examples as disclosed herein. The operations of method 800 may be implemented by a memory system or its components as described herein. For example, the operations of method 800 may be performed by a memory system as described with reference to FIGS. 1 through 4 and 6. In some examples, a memory system may execute a set of instructions to control the functional elements of the device to perform the described functions. Additionally, or alternatively, the memory system may perform aspects of the described functions using special-purpose hardware.

At 805, the method may include receiving, by a memory system from a first host system, a first message for a second host system coupled with the memory system. The operations of 805 may be performed in accordance with examples as disclosed herein. In some examples, aspects of the operations of 805 may be performed by a reception component 625 as described with reference to FIG. 6.

At 810, the method may include writing, by the memory system, the first message to a buffer of the memory system based at least in part on receiving the first message, where the first host system has write access and read access to the buffer and the second host system has read access to the buffer. The operations of 810 may be performed in accordance with examples as disclosed herein. In some examples, aspects of the operations of 810 may be performed by a writing component 630 as described with reference to FIG. 6.

At 815, the method may include transmitting, to the second host system, an interrupt signal based at least in part on writing the first message to the buffer. The operations of 815 may be performed in accordance with examples as disclosed herein. In some examples, aspects of the operations of 815 may be performed by a transmission component 635 as described with reference to FIG. 6.

At 820, the method may include transmitting the first message from the buffer of the memory system to the second host system based at least in part on transmitting the interrupt signal. The operations of 820 may be performed in accordance with examples as disclosed herein. In some examples, aspects of the operations of 820 may be performed by a transmission component 635 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 14: A method, apparatus, or non-transitory computer-readable medium including operations, features, circuitry, logic, means, or instructions, or any combination thereof for receiving, by a memory system from a first host system, a first message for a second host system coupled with the memory system; writing, by the memory system, the first message to a buffer of the memory system based at least in part on receiving the first message, where the first host system has write access and read access to the buffer and the second host system has read access to the buffer; transmitting, to the second host system, an interrupt signal based at least in part on writing the first message to the buffer; and transmitting the first message from the buffer of the memory system to the second host system based at least in part on transmitting the interrupt signal.

Aspect 15: The method, apparatus, or non-transitory computer-readable medium of aspect 14, further including operations, features, circuitry, logic, means, or instructions, or any combination thereof for receiving, by a register the memory system from the first host system, an indication that the second host system is a target host system for the first message written to the buffer, where transmitting the interrupt signal is based at least in part on the first host system writing the indication.

Aspect 16: The method, apparatus, or non-transitory computer-readable medium of aspect 15, further including operations, features, circuitry, logic, means, or instructions, or any combination thereof for transmitting the indication to the second host system based at least in part on transmitting the interrupt signal, where reading the first message is based at least in part on transmitting the indication.

Aspect 17: The method, apparatus, or non-transitory computer-readable medium of any of aspects 15 through 16, where the indication that the second host system is the target host system indicates that the first host system designated the second host system as the target host system.

Aspect 18: The method, apparatus, or non-transitory computer-readable medium of any of aspects 14 through 17, where the first message is written to the buffer according to a file system of the memory system and the first message is transmitted from the buffer according to the file system of the memory system.

Aspect 19: The method, apparatus, or non-transitory computer-readable medium of any of aspects 14 through 18, further including operations, features, circuitry, logic, means, or instructions, or any combination thereof for transmitting, by the memory system to a third host system, the interrupt signal based at least in part on writing the first message to the buffer and transmitting, by the memory system to the third host system, the first message from the buffer based at least in part on transmitting the interrupt signal.

Aspect 20: The method, apparatus, or non-transitory computer-readable medium of aspect 19, further including operations, features, circuitry, logic, means, or instructions, or any combination thereof for transmitting, by the memory system to a fourth host system, the interrupt signal based at least in part on writing the first message to the buffer and transmitting, by the memory system to the fourth host system, the first message from the buffer based at least in part on transmitting the interrupt signal, where at least one of the third host system and the fourth host system includes a virtual host system.

Aspect 21: The method, apparatus, or non-transitory computer-readable medium of any of aspects 14 through 20, further including operations, features, circuitry, logic, means, or instructions, or any combination thereof for transmitting, by the memory system to each host system of a plurality of host systems coupled with the memory system, the interrupt signal based at least in part on the writing the first message to the buffer and transmitting, by the memory system to each host system of the plurality of host systems, the first message from the buffer based at least in part on transmitting the interrupt signal.

Aspect 22: The method, apparatus, or non-transitory computer-readable medium of any of aspects 14 through 21, further including operations, features, circuitry, logic, means, or instructions, or any combination thereof for receiving, from the second host system, an acknowledgement message of the first message; writing, by the memory system, the acknowledgement message to a second buffer of the memory system based at least in part on receiving the acknowledgement message, where the second host system has write access and read access to the second buffer and the first host system has read access to the second buffer; transmitting, by the memory system to the first host system, a second interrupt signal based at least in part on the acknowledgement message; and transmitting, by the memory system to the first host system, the acknowledgement message from the second buffer of the memory system based at least in part on transmitting the second interrupt signal.

Aspect 23: The method, apparatus, or non-transitory computer-readable medium of aspect 22, further including operations, features, circuitry, logic, means, or instructions, or any combination thereof for erasing, by the memory system, the first message from the buffer of the memory system based at least in part on transmitting the acknowledgement message from the second buffer of the memory system.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
    receiving, by a memory system from a first host system, a write command to store first data to a buffer of the memory system, wherein the buffer is coupled with the first host system and a second host system different than the first host system;
    writing, by the memory system, the first data to the buffer of the memory system based at least in part on receiving the write command, wherein the first host system has write access and read access to the buffer and the second host system has read access to the buffer;
    transmitting, to the second host system, an interrupt signal indicating to suspend one or more operations for a duration and to read the buffer based at least in part on writing the first data to the buffer; and
    transmitting the first data from the buffer of the memory system to the second host system based at least in part on transmitting the interrupt signal.

2. The method of claim 1, further comprising:
    receiving, by a register of the memory system from the first host system, an indication that the second host system is a target host system for the first data written to the buffer, wherein transmitting the interrupt signal is based at least in part on the first host system writing the indication.

3. The method of claim 2, further comprising:
    transmitting the indication to the second host system based at least in part on transmitting the interrupt signal, wherein reading the first data is based at least in part on transmitting the indication.

4. The method of claim 2, wherein the indication that the second host system is the target host system indicates that the first host system designated the second host system as the target host system.

5. The method of claim 1, wherein the first data is written to the buffer according to a file system of the memory system, and the first data is transmitted from the buffer according to the file system of the memory system.

6. The method of claim 1, further comprising:
    transmitting, by the memory system to a third host system, the interrupt signal based at least in part on writing the first data to the buffer; and
    transmitting, by the memory system to the third host system, the first data from the buffer based at least in part on transmitting the interrupt signal.

7. The method of claim 6, further comprising:
    transmitting, by the memory system to a fourth host system, the interrupt signal based at least in part on writing the first data to the buffer; and
    transmitting, by the memory system to the fourth host system, the first data from the buffer based at least in part on transmitting the interrupt signal, wherein at least one of the third host system and the fourth host system comprises a virtual host system.

8. The method of claim 1, further comprising:
    transmitting, by the memory system to each host system of a plurality of host systems coupled with the memory system, the interrupt signal based at least in part on the writing the first data to the buffer; and
    transmitting, by the memory system to each host system of the plurality of host systems, the first data from the buffer based at least in part on transmitting the interrupt signal.

9. The method of claim 1, further comprising:
    receiving, from the second host system, an acknowledgement message associated with the first data;
    writing, by the memory system, the acknowledgement message to a second buffer of the memory system based at least in part on receiving the acknowledgement message, wherein the second host system has write access and read access to the second buffer and the first host system has read access to the second buffer;
    transmitting, by the memory system to the first host system, a second interrupt signal based at least in part on the acknowledgement message; and
    transmitting, by the memory system to the first host system, the acknowledgement message from the second buffer of the memory system based at least in part on transmitting the second interrupt signal.

10. The method of claim 9, further comprising:
    erasing, by the memory system, the first data from the buffer of the memory system based at least in part on transmitting the acknowledgement message from the second buffer of the memory system.

11. A method, comprising:
    receiving, by a first host system, an interrupt signal indicating to suspend one or more operations for a duration and to read a buffer of a memory system based at least in part on a second host system transmitting first data to the buffer of the memory system, wherein the buffer is coupled with the first host system and the second host system, the second host system different than the first host system; and
    reading, by the first host system, the first data from the buffer of the memory system based at least in part on receiving the interrupt signal.

12. The method of claim 11, further comprising:

reading, by the first host system, an indication from a register of the memory system that the first host system is a target host system for the first data written to the buffer, wherein receiving the interrupt signal by the first host system is based at least in part on the second host system writing the indication to the register.

13. The method of claim 12, wherein the indication that the first host system is the target host system indicates that the second host system designated the first host system as the target host system.

14. The method of claim 11, further comprising:
refraining, by the first host system, from performing the one or more operations for the duration based at least in part on receiving the interrupt signal, wherein the first data is read from the buffer by the first host system during at least a portion of the duration.

15. The method of claim 14, further comprising:
resuming, by the first host system, performing the one or more operations after the duration.

16. The method of claim 11, wherein the first data is written to the buffer by the second host system according to a file system of the memory system, and the first data is read from the buffer by the first host system according to the file system of the memory system.

17. The method of claim 11, wherein the first data written to the buffer by the second host system is associated with a communication different than shared drive access or shared file system access associated with the memory system.

18. The method of claim 11, further comprising:
writing, by the first host system, an acknowledgement message to a second buffer of the memory system, wherein the first host system has write access and read access to the second buffer and the second host system has read access to the second buffer.

19. A non-transitory computer-readable medium storing code, the code comprising instructions executable by processing circuitry to:
receive, by a memory system from a first host system, a write command to store first data to a buffer of the memory system, wherein the buffer is coupled with the first host system and a second host system different than the first host system;
write, by the memory system, the first data to the buffer of the memory system based at least in part on receiving the write command, wherein the first host system has write access and read access to the buffer and the second host system has read access to the buffer;
transmit, to the second host system, an interrupt signal indicating to suspend one or more operations for a duration and read to the buffer based at least in part on writing the first data to the buffer; and
transmit the first data from the buffer of the memory system to the second host system based at least in part on transmitting the interrupt signal.

20. The non-transitory computer-readable medium of claim 19, wherein the instructions are further executable by the processing circuitry to:
receive, by a register of the memory system from the first host system, an indication that the second host system is a target host system for the first data written to the buffer, wherein transmitting the interrupt signal is based at least in part on the first host system writing the indication.

21. The non-transitory computer-readable medium of claim 20, wherein the instructions are further executable by the processing circuitry to:
transmit the indication to the second host system based at least in part on transmitting the interrupt signal, wherein reading the first data is based at least in part on transmitting the indication.

22. The non-transitory computer-readable medium of claim 20, wherein the indication that the second host system is the target host system indicates that the first host system designated the second host system as the target host system.

23. The non-transitory computer-readable medium of claim 19, wherein:
the first data is written to the buffer according to a file system of the memory system, and
the first data is transmitted from the buffer according to the file system of the memory system.

24. The non-transitory computer-readable medium of claim 19, wherein the instructions are further executable by the processing circuitry to:
transmit, by the memory system to a third host system, the interrupt signal based at least in part on writing the first data to the buffer; and
transmit, by the memory system to the third host system, the first data from the buffer based at least in part on transmitting the interrupt signal.

25. The non-transitory computer-readable medium of claim 24, wherein the instructions are further executable by the processing circuitry to:
transmit, by the memory system to a fourth host system, the interrupt signal based at least in part on writing the first data to the buffer; and
transmit, by the memory system to the fourth host system, the first data from the buffer based at least in part on transmitting the interrupt signal, wherein at least one of the third host system and the fourth host system comprises a virtual host system.

* * * * *